(12) United States Patent
Lin et al.

(10) Patent No.: US 9,753,255 B2
(45) Date of Patent: Sep. 5, 2017

(54) ARRAY LENS SYSTEM

(71) Applicant: HIMAX TECHNOLOGIES LIMITED, Tainan (TW)

(72) Inventors: Han-Ching Lin, Tainan (TW); Han-Yi Kuo, Tainan (TW)

(73) Assignee: Himax Technologies Limited, Tainan (TW)

(*) Notice: Subject to any disclaimer, the term of this patent is extended or adjusted under 35 U.S.C. 154(b) by 15 days.

(21) Appl. No.: 14/931,559

(22) Filed: Nov. 3, 2015

(65) Prior Publication Data

US 2017/0123183 A1 May 4, 2017

(51) Int. Cl.
*G02B 9/34* (2006.01)
*G02B 13/00* (2006.01)

(52) U.S. Cl.
CPC .............. *G02B 13/004* (2013.01); *G02B 9/34* (2013.01); *G02B 13/0065* (2013.01)

(58) Field of Classification Search
CPC ..... G02B 13/004; G02B 13/0065; G02B 9/34
USPC .................................................. 359/772, 726
See application file for complete search history.

(56) References Cited

U.S. PATENT DOCUMENTS

| | | | |
|---|---|---|---|
| 6,744,570 B1 | 6/2004 | Isono | |
| 2006/0092524 A1* | 5/2006 | Konno | G02B 13/003 359/678 |
| 2007/0024739 A1 | 2/2007 | Konno | |
| 2011/0124373 A1 | 5/2011 | Fukuta | |
| 2015/0286033 A1 | 10/2015 | Osborne | |
| 2015/0288865 A1 | 10/2015 | Osborne | |

FOREIGN PATENT DOCUMENTS

WO WO2015/025802 A1 2/2015

OTHER PUBLICATIONS

Office Action Dated Apr. 22, 2016 in corresponding European Patent Application No. 15193260.5.
Office Action Dated Aug. 2, 2016 in corresponding Japanese Patent Application No. 2015-229605.

* cited by examiner

*Primary Examiner* — Alicia M Harrington
(74) *Attorney, Agent, or Firm* — Donald E. Stout; Stout, Uxa & Buyan, LLP

(57) ABSTRACT

An array lens system composed of a plurality of array lenses, each includes a first optical device with a first reflection surface, a positive-powered first lens group, a positive-powered second lens group, a negative-powered third lens group, a second optical device with a second reflection surface, and a negative-powered fourth lens group arranged in an order from an object side to an image side.

19 Claims, 2 Drawing Sheets

ARRAY LENS SYSTEM

BACKGROUND OF THE INVENTION

1. Field of the Invention

The present invention generally relates to an array lens system, and more particularly to an array lens system with a right-angle prism.

2. Description of Related Art

Wafer level optics is a technique of fabricating miniaturized optics such as lens module or camera module at the wafer level using semiconductor techniques. The wafer level optics is well adapted to mobile or handheld devices, to which photograph has become an indispensable function.

As the size of an image sensor, such as a charge-coupled devices (CCD) or a complementary metal-oxide-semiconductor image sensor (CIS), is scaled down, the photographic lens need be scaled down too.

Imaging lens design is a stringent process to achieve requirements such as low volume, light weight, low cost but high resolution. There is a need for a designer to propose a novel imaging optical device, particularly a wafer-level miniaturized optical device that has high image quality with low volume and light weight.

SUMMARY OF THE INVENTION

In view of the foregoing, it is an object of the embodiment of the present invention to provide an array lens system that has high image quality with low volume and light weight.

According to one embodiment, an array lens system composed of a plurality of array lenses, each includes a first optical device with a first reflection surface, a positive-powered first lens group, a positive-powered second lens group, a negative-powered third lens group, a second optical device with a second reflection surface, and a negative-powered fourth lens group arranged in an order from an object side to an image side.

DETAILED DESCRIPTION OF THE INVENTION

Figure 1A:
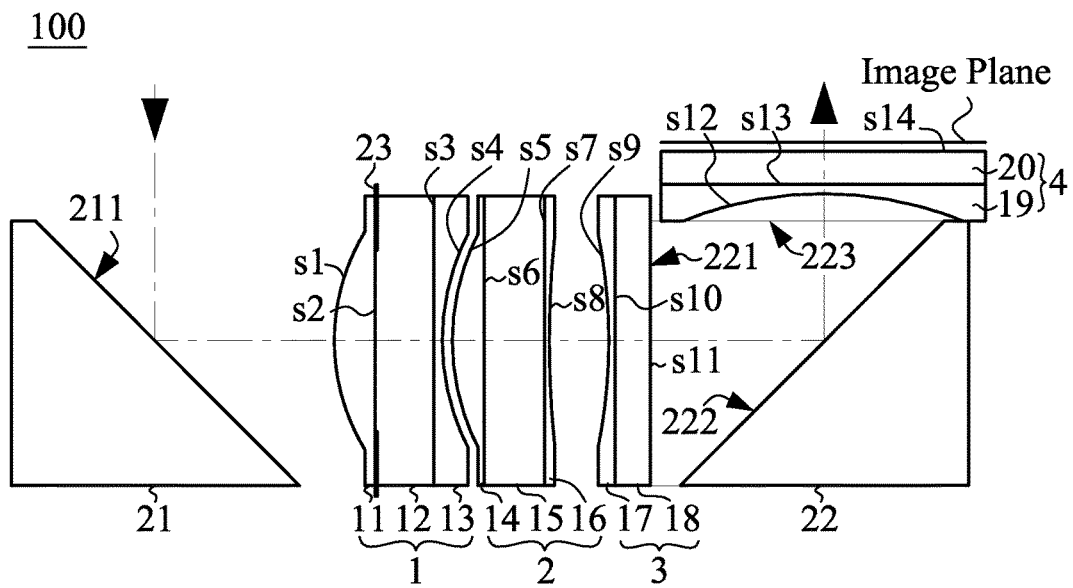
FIG. 1A shows a lens arrangement of an array lens according to one embodiment of the present invention.
Figure 1B:
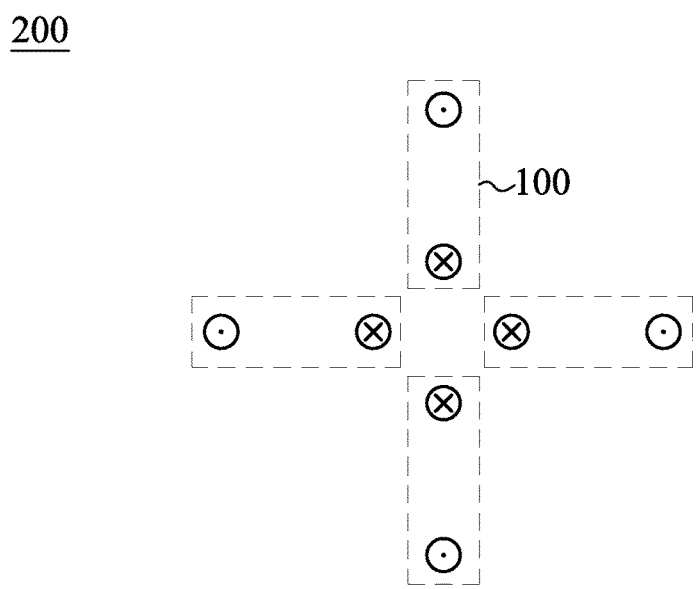
FIG. 1B schematically shows a top view of an array lens system that is composed of a plurality of array lenses of FIG. 1A.
Figure 2:
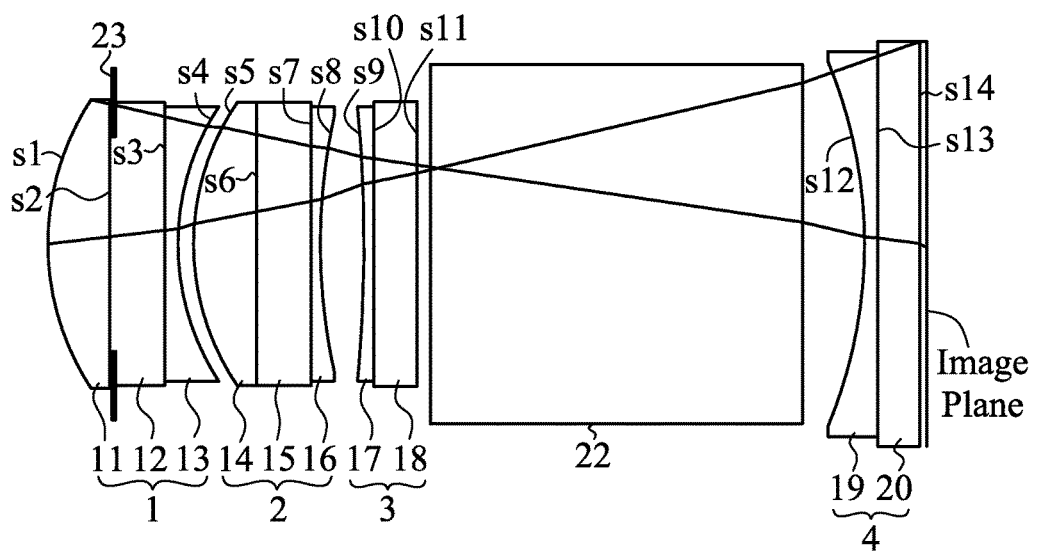
FIG. 2 shows a lens track of the array lens of FIG. 1A.

FIG. 1A shows a lens arrangement of an array lens 100 according to one embodiment of the present invention. FIG. 1B schematically shows a top view of an array lens system 200 that is composed of a plurality (e.g., four) of array lenses 100, where symbol dot (•) represents an incoming light and symbol cross (x) represents an outgoing light. FIG. 2 shows a lens track of the array lens 100 of FIG. 1A. The array lens 100 of the embodiment may be preferably fabricated by wafer-level optics (WLO) technique. The array lens 100 of the embodiment may be composed of a transparent material such as glass or plastic. In the drawing, the upper-left side of the array lens 100 faces an object, and the upper-right side of the array lens 100 faces an image plane.

In the embodiment, the array lens 100 may include, in the order from the object side to the image side, a first optical device 21 (with a first reflection surface 211), a positive-powered first lens group 1 (that is, a lens group with positive refractive power), a positive-powered second lens group 2, a negative-powered third lens group 3 (that is, a lens group with negative refractive power), a second optical device 22 (with a second reflection surface 222) and a negative-powered fourth lens group 4.

In a specific embodiment as illustrated in FIG. 1A, the first optical device 21 may include a mirror. In another embodiment, however, the first optical device 21 may, for example, include a prism. The first optical device 21 of the embodiment may be adjustable to adapt to a required angle of the incoming light. The second optical device 22 may include a prism. In another embodiment, the second optical device 22 may, for example, include a mirror.

Specifically, the positive-powered first lens group 1 may include, in the order from the object side to the image side, a convex first lens 11, an aperture (or stop) 23, a flat second lens 12 and a concave third lens 13. To be more specific, the convex first lens 11 has an aspherical convex object-side surface s1 and a planar image-side surface s2. The flat second lens 12 has a planar object-side surface s2 and a planar image-side surface s3. The concave third lens 13 has a planar object-side surface s3 and a concave image-side surface s4. In the embodiment, the convex first lens 11 is in substantially contact with the flat second lens 12, which is further in substantially contact with the concave third lens 13.

The positive-powered second lens group 2 may include, in the order from the object side to the image side, a convex fourth lens 14, a flat fifth lens 15 and a concave sixth lens 16. To be more specific, the convex fourth lens 14 has an aspherical convex object-side surface s5 and a planar image-side surface s6. The flat fifth lens 15 has a planar object-side surface s6 and a planar image-side surface s7. The concave sixth lens 16 has a planar object-side surface s7 and a concave image-side surface s8. In the embodiment, the convex fourth lens 14 is in substantially contact with the flat fifth lens 15, which is further in substantially contact with the concave sixth lens 16.

The negative-powered third lens group 3 may include, in the order from the object side to the image side, a concave seventh lens 17 and a flat eighth lens 18. To be more specific, the concave seventh lens 17 has an aspherical concave object-side surface s9 and a planar image-side surface s10. The flat eighth lens 18 has a planar object-side surface s10 and a planar image-side surface s11. In the embodiment, the concave seventh lens 17 is in substantially contact with the flat eighth lens 18.

The negative-powered fourth lens group 4 may include, in the order from the object side to the image side, a concave ninth lens 19 and a flat tenth lens 20. To be more specific, the concave ninth lens 19 has an aspherical concave object-side surface s12 and a planar image-side surface s13. The flat tenth lens 20 has a planar object-side surface s13 and a planar image-side surface s14. In the embodiment, the concave ninth lens 19 is in substantially contact with the flat tenth lens 20.

As shown in FIG. 1A, an incident light enters a first surface 221 of the second optical device 22, is reflected by the second reflection surface 222, and then leaves a third surface 223 of the second optical device 22. In the embodiment, the first surface 221 and the third surface 223 have a right angle therebetween, thereby forming a right-angle prism.

In an exemplary embodiment, the array lens 100 may further include an infra-red filter (not shown) coated on at least one surface of the flat second lens 12, the flat fifth lens 15, the flat eighth lens 18 or the flat tenth lens 20.

According to one aspect of the embodiment, the convex first lens 11, the convex fourth lens 14 and the concave sixth lens 16 have a refractive index ranging between 1.512 and 1.52, and have an Abbe number ranging between 48.7 and 56.5. In a more specific embodiment, a difference between Abbe number V1 of the convex first lens 11 and Abbe number V2 of the concave third lens 13 is in a range between 17 and 25 (i.e., 17<V1−V2<25).

According to another aspect of the embodiment, the flat second lens 12, the flat fifth lens 15, the flat eighth lens 18 and the flat tenth lens 20 have a refractive index ranging between 1.5 and 1.6, and have an Abbe number ranging between 40 and 60. In a more specific embodiment, a ratio of focal length EF34 of the positive-powered second lens group 2 to focal length EF12 of the positive-powered first lens group 1 is in a range between 0.01 and 0.28 (i.e., 0.01<EF34/EF12<0.28).

Figure 3:
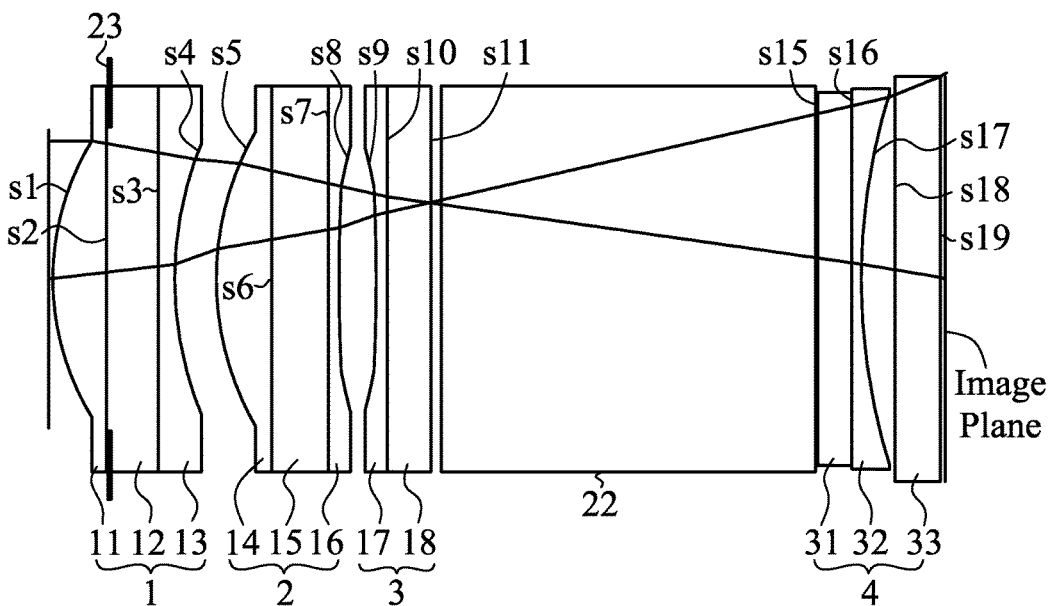
FIG. 3 shows a lens track of an array lens according to an alternative embodiment of the present invention.

FIG. 3 shows a lens track of an array lens 300 according to an alternative embodiment of the present invention. In the embodiment, the negative-powered fourth lens group 4 may include, in the order from the object side to the image side, a flat eleventh lens 31, a concave twelfth lens 32 and a flat thirteenth lens 33. To be more specific, the flat eleventh lens 31 has a planar object-side surface s15 and a planar image-side surface s16. The concave twelfth lens 32 has a planar object-side surface s16 and an aspherical concave image-side surface s17. The flat thirteenth lens 33 has a planar object-side surface s18 and a planar image-side surface s19. In the embodiment, the flat eleventh lens 31 is in substantially contact with the concave twelfth lens 32.

The refractive index and the Abbe number of the present embodiment are similar to the previous embodiment. Moreover, the flat eleventh lens 31 and the flat thirteenth lens 33 have a refractive index ranging between 1.5 and 1.6, and have an Abbe number ranging between 40 and 60.

The aspheric surface (e.g., s1, s4, s5, s8, s9, s12 or s17) may be defined by the following equation:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where z is a distance from a vertex of lens in an optical axis direction, r is a distance in the direction perpendicular to the optical axis, c is a reciprocal of radius of curvature on vertex of lens, k is a conic constant and $\alpha_1$ to $\alpha_8$ are aspheric coefficients. It is noted that the array lenses 100 of the array lens system 200 (FIG. 1B) may have the same or different parameters of the above equation.

Although specific embodiments have been illustrated and described, it will be appreciated by those skilled in the art that various modifications may be made without departing from the scope of the present invention, which is intended to be limited solely by the appended claims.

What is claimed is:

1. An array lens system composed of a plurality of array lenses, each comprising:
a first optical device with a first reflection surface;
a positive-powered first lens group;
a positive-powered second lens group;
a negative-powered third lens group;
a second optical device with a second reflection surface; and
a negative-powered fourth lens group;
wherein the first optical device, the positive-powered first lens group, the positive-powered second lens group, the negative-powered third lens group; the second optical device and the negative-powered fourth lens group are arranged in an order from an object side to an image side;
wherein the positive-powered first lens group comprises a convex first lens, an aperture, a flat second lens and a concave third lens arranged in the order from the object side to the image side;
wherein the positive-powered second lens group comprises a convex fourth lens, a flat fifth lens and a concave sixth lens arranged in the order from the object side to the image side;
wherein the negative-powered third lens group comprises a concave seventh lens and a flat eighth lens arranged in the order from the object side to the image side; and
wherein the negative-powered fourth lens group comprises a concave ninth lens and a flat tenth lens arranged in the order from the object side to the image side.

2. The array lens system of claim 1, wherein the first optical device is adjustable to adapt to a predetermined angle of an incoming light.

3. The array lens system of claim 1, wherein the first optical device comprises a mirror.

4. The array lens system of claim 1, wherein the second optical device comprises a right-angle prism.

5. The array lens system of claim 1, further comprising an infra-red filter coated on at least one surface of a flat lens of the positive-powered first lens group, the positive-powered second lens group, the negative-powered third lens group or the negative-powered fourth lens group.

6. The array lens system of claim 1, wherein the convex first lens has an aspherical convex object-side surface and a planar image-side surface; the flat second lens has a planar object-side surface and a planar image-side surface; and the concave third lens has a planar object-side surface and a concave image-side surface.

7. The array lens system of claim 1, wherein the convex fourth lens has an aspherical convex object-side surface and a planar image-side surface; the flat fifth lens has a planar object-side surface and a planar image-side surface; and the concave sixth lens has a planar object-side surface and a concave image-side surface.

8. The array lens system of claim 1, wherein the concave seventh lens has an aspherical concave object-side surface and a planar image-side surface; and the flat eighth lens has a planar object-side surface and a planar image-side surface.

9. The array lens system of claim 1, wherein the concave ninth lens has an aspherical concave object-side surface and a planar image-side surface; and the flat tenth lens has a planar object-side surface and a planar image-side surface.

10. The array lens system of claim 1, wherein the convex first lens, the convex fourth lens and the concave sixth lens have a refractive index ranging between 1.512 and 1.52.

11. The array lens system of claim 1, wherein the convex first lens, the convex fourth lens and the concave sixth lens have an Abbe number ranging between 48.7 and 56.5.

12. The array lens system of claim 1, wherein a difference between Abbe number of the convex first lens and Abbe number of the concave third lens is in a range between 17 and 25.

13. The array lens system of claim 1, wherein the flat second lens, the flat fifth lens, the flat eighth lens and the flat tenth lens have a refractive index ranging between 1.5 and 1.6.

14. The array lens system of claim 1, wherein the flat second lens, the flat fifth lens, the flat eighth lens and the flat tenth lens have an Abbe number ranging between 40 and 60.

15. The array lens system of claim 1, wherein a ratio of focal length of the positive-powered second lens group to focal length of the positive-powered first lens group is in a range between 0.01 and 0.28.

16. An array lens system composed of a plurality of array lenses, each comprising:
- a first optical device with a first reflection surface;
- a positive-powered first lens group;
- a positive-powered second lens group;
- a negative-powered third lens group;
- a second optical device with a second reflection surface; and
- a negative-powered fourth lens group;
- wherein the first optical device, the positive-powered first lens group, the positive-powered second lens group, the negative-powered third lens group; the second optical device and the negative-powered fourth lens group are arranged in an order from an object side to an image side;
- wherein the positive-powered first lens group comprises a convex first lens, an aperture, a flat second lens and a concave third lens arranged in the order from the object side to the image side;
- wherein the positive-powered second lens group comprises a convex fourth lens, a flat fifth lens and a concave sixth lens arranged in the order from the object side to the image side;
- wherein the negative-powered third lens group comprises a concave seventh lens and a flat eighth lens arranged in the order from the object side to the image side; and
- wherein the negative-powered fourth lens group comprises a flat eleventh lens, a concave twelfth lens and a flat thirteenth lens arranged in the order from the object side to the image side.

17. The array lens system of claim 16, wherein the flat eleventh lens has a planar object-side surface and a planar image-side surface; the concave twelfth lens has a planar object-side surface and an aspherical concave object-side surface; and the flat thirteenth lens has a planar object-side surface and a planar image-side surface.

18. The array lens system of claim 16, wherein the flat second lens, the flat fifth lens, the flat eighth lens, the flat eleventh lens and the flat thirteenth lens have a refractive index ranging between 1.5 and 1.6.

19. The array lens system of claim 16, wherein the flat second lens, the flat fifth lens, the flat eighth lens, the flat eleventh lens and the flat thirteenth lens have an Abbe number ranging between 40 and 60.

* * * * *